Patented Nov. 9, 1937

2,098,637

UNITED STATES PATENT OFFICE 2,098,637

SERUM TREATMENT FOR MANGE

Hugh J. Tingley, Winnipeg, Manitoba, Canada

No Drawing. Application January 13, 1936, Serial No. 58,985

3 Claims. (Cl. 167—53.2)

My invention relates to an improved treatment for mange in animals, especially dogs, the treatment being directed to the particular form of mange known as Demodectic mange.

External treatment for Demodectic mange in dogs is generally unsuccessful, the large number of courses of such external treatment going to prove that none are specific.

My treatment, therefore, is by the injection of a serum, the serum being obtained and rendered suitable for use in the following manner.

The primary constituent of the innoculating substance I use is the fluid obtained from the amnion and allantois of bitches. To each one part of this fluid, I add three parts of .85 per cent sodium chloride solution with .5 of one per cent of phenol as a preservative.

The amniotic and allantoic fluids are collected into a sterile container while performing a Caesarean section or at normal parturition. The dilution is made at this time, the substance being afterwards filtered through a filter paper after which the above percentage of phenol is added. The solution is now kept at 20° C. for twenty-four hours and then again filtered.

The fluid is now sterilized as follows. The temperature of the solution is raised at 53° C. for fifteen minutes and then allowed to stand at room temperature for twenty-four hours, after which it is again heated to 53° C., for fifteen minutes and again allowed to stand at room temperature for twenty-four hours after cooling from the second heating. After this an agar slant and a deep stab inoculation is made and incubated at 37° C. for twenty-four hours to test for sterility.

By this method of sterilization, the bacteria are caused to grow out of the resistant stages after which they are more readily killed in the vegetative stage. This method also has the great advantage of requiring less heat so as not to kill the probable antigenic properties of the fluid.

When sterilized, the fluid is stored in air tight glass containers and kept in a temperature of 20° C.

For therapeutic purposes, my fluid is administered subcutaneously in doses of five to ten c. c. at intervals of five to seven days apart. The action which takes place is probably due to a specific antigenic quality which the sterilized amniotic and allantoic fluids possess against pathogenesis and dermatitis and in this connection, I may say that I have found that the fluids of one subject may carry more antigenic qualities than one less robust.

Although it will be noted that I have so far obtained my serum from female canines, I may also obtain this serum from the amnion and allantois of other species of animals.

Since various modifications can be made in the above discovery, and many apparently widely different embodiments of same, made within the scope of the claims without departing from the spirit and scope thereof, it is intended that all matter contained in the accompanying specification shall be interpreted as illustrative only and not in a limiting sense and I desire only such limitations placed thereon as are specifically expressed in the accompanying claims.

What I claim as my invention is:—

1. The process of producing a serum for the subcutaneous treatment of mange in canines consisting of the extraction of fluid from the amnion and allantois of bitches at the time of the performance of a Caesarean section or at normal parturition, the said amniotic and allantoic fluids being afterwards combined with a percentage of a saline and with phenol, said composition being afterwards filtered.

2. The process as claimed in claim 1 in which the composition consisting of amniotic fluid, allantoic fluid, a saline and phenol, is maintained at a temperature of approximately 20° C. for a period of approximately twenty-four hours and again filtered.

3. The process of producing a serum for the subcutaneous treatment of mange in canines consisting of the extraction of fluid from the amnion and allantois of bitches at the time of the performance of a Caesarean section or at normal parturition, the said amniotic and allantoic fluids being afterwards combined with a percentage of a saline and with phenol, being afterwards filtered and thereafter maintained at a temperature of approximately 20° C. for a period of approximately twenty-four hours, the serum being next raised to a temperature of approximately 53° C. for approximately fifteen minutes, then allowed to stand at room temperature for approximately twenty-four hours, the process of raising the temperature of the serum to approximately 53° C. and permitting same to cool for approximately twenty-four hours being repeated a plurality of times.

HUGH J. TINGLEY.